United States Patent
Abel et al.

(10) Patent No.: US 12,554,032 B2
(45) Date of Patent: Feb. 17, 2026

(54) METHOD AND SYSTEM FOR SEISMIC DATA COMPRESSION AND NOISE REDUCTION

(71) Applicant: Seismic Services LLC, Menlo Park, CA (US)

(72) Inventors: Jonathan S. Abel, Menlo Park, CA (US); Sean A. Coffin, Redwood City, CA (US)

(*) Notice: Subject to any disclaimer, the term of this patent is extended or adjusted under 35 U.S.C. 154(b) by 542 days.

(21) Appl. No.: 17/668,270

(22) Filed: Feb. 9, 2022

(65) Prior Publication Data
US 2022/0381933 A1  Dec. 1, 2022

Related U.S. Application Data

(60) Provisional application No. 63/147,663, filed on Feb. 9, 2021.

(51) Int. Cl.
*G01V 1/36* (2006.01)

(52) U.S. Cl.
CPC ........ *G01V 1/364* (2013.01); *G01V 2210/324* (2013.01)

(58) Field of Classification Search
None
See application file for complete search history.

(56) References Cited

U.S. PATENT DOCUMENTS

| 2005/0027454 A1* | 2/2005 | Vaage | G01V 1/364 702/17 |
| 2011/0013482 A1* | 1/2011 | Eick | G01V 1/005 367/38 |

* cited by examiner

*Primary Examiner* — Walter L Lindsay, Jr.
*Assistant Examiner* — Geoffrey T Evans
(74) *Attorney, Agent, or Firm* — FOLEY & LARDNER LLP (57) ABSTRACT

In the field of seismic data collection and analysis, the problem of data compression is considered. It is desired to reduce the storage and transmission requirements of seismic data, such as associated with microseismic monitoring and processing, VSP (vertical seismic profile) surveys, and the like, for instance using a distributed acoustic sensor (DAS), which can generate in excess of 50 GB of data per hour on a survey that lasts days. A method and system for data compression that separates the data collected into additive signal and noise components, and compresses the estimated signal component for transmission, storage, and analysis, is described. The idea is that the signal component, which exhibits clear structure across the traces, may be accurately described with relatively few parameters, and therefore may be significantly compressed without loss of important information.

13 Claims, 11 Drawing Sheets

METHOD AND SYSTEM FOR SEISMIC DATA COMPRESSION AND NOISE REDUCTION

CROSS-REFERENCE TO RELATED APPLICATIONS

The present application claims priority to U.S. Provisional Patent Application No. 63/147,663 filed Feb. 9, 2021, the contents of which are incorporated herein by reference in their entirety.

TECHNICAL FIELD

The present embodiments relate generally to activities related to seismic events and more particularly to technology for seismic trace processing and data compression for seismic data collected from seismic sensors.

BACKGROUND

Passive localization of microseismic events is commonly used to monitor resource extraction processes such as hydraulic fracture stimulation, or "fracking." In a typical scenario, an array of 3-axis geophones is positioned in a monitor well nearby the well undergoing treatment. In other scenarios, a distributed acoustic sensor (DAS), recording 1-axis data along a densely sampled fiber optic cable, is deployed. In further scenarios, a surface microseismic array recording 1-axis data is employed. The array records, for instance, seismic energy released impulsively from induced failure events as fractures form. Arrival times and polarizations of P-waves and S-waves impinging the array, among other features, are used to estimate the location of each detected event. Additional information about the event, treatment, and seismic propagation environment is contained in the arriving waveforms. For example, the measure of seismic propagation loss, Q, may be estimated by analyzing the spectral content of arrivals as the wavefront propagates across the sensors of the array. Additionally, the event moment magnitude and its moment tensor may be estimated from arriving waveform features.

In addition to transient sources of seismic energy, other sources may be of interest that appear in a structured manner across sensors in the array. Knowledge of these seismic signals similarly may reveal information about the source, propagation environment, and treatment. One difficulty is that the arriving wavefronts are often corrupted by significant seismic background energy and sensor noise, which obscures important event wavefront features. Processing of the sensor traces such as bandpass filtering or Wiener filtering are commonly applied to suppress frequency bands in which the event wavefront signal-to-noise ratio is poor—note that here "noise" refers to both the seismic background and sensor noise. However, in many cases such processing doesn't remove a sufficient amount of the seismic background to effectively understand details of the arriving wavefront. Other non-linear processing techniques, such as adaptive filtering methods, suppress noise effectively, but can alter the arriving waveforms in doing so.

Another difficulty is that large amounts of data are typically produced: In a DAS, in excess of 50 GB of data per hour is commonly generated, requiring significant resources for storage, transmission, and analysis of the collected data. Such large amounts of data present barriers to offsite and real-time processing, as well as to cloud processing.

Thus, there is a need for a seismic trace processing and data compression method which can remove a significant amount of seismic background and sensor noise from a collection of seismic traces, encode them in a manner that requires much less storage and transmission bandwidth, and have the decoded traces preserve important features of the arriving waveforms. Although the present Applicant has developed many dramatic improvements in the state of the art of microseismic event localization technology, (U.S. Pat. Nos. 10,545,250, 10,338,246 and 9,945,970, the contents of which are incorporated herein by reference in their entirety) opportunities for further improvement remain, including improvements in connection with the above and other issues.

It is against this technological backdrop that the present Applicant sought a technological solution to these and other problems that are deeply rooted in this technology.

SUMMARY

The present embodiments relate generally to seismic events and more particularly to a system and method for suppressing the background seismic energy and sensor noise present in a set of seismic traces, while encoding the traces to produce a set of enhanced traces that require significantly less resources to store and transmit. According to another aspect, an approach to data compression flows from the observation that the desired arriving wavefronts have structure which can be expressed with relatively few parameters, while the additive seismic background and sensor noise are difficult to compress, requiring a significant amount of data to describe. This approach processes the recorded seismic traces to produce an encoded signal component that has been separated from an additive noise component. In this way, the signal component retains its clear structure across the traces, and is compactly described without loss of important information.

In an example system according to embodiments, the seismic traces and other information are processed and encoded to achieve a data compression. The compressed data is then stored or transmitted for future retrieval or reception, at which point it may be decoded into traces, or event waveforms or other seismic source waveforms. For example, seismic data, such as traces from a sensor array, and information about the sensor array, propagation environment, and the like, are processed in source signal estimator to estimate source signal components of interest and their structure as they appear across the array, and according to given memory or bandwidth targets. The estimated components and structure are then encoded to produce compressed seismic data, which is transmitted and/or stored. The transmitted or stored compressed seismic data may then be received or retrieved, and decoded and reconstructed into the expanded trace data, which is an estimate of the desired seismic signals arriving at the array.

In one embodiment of the present invention, recorded traces are bandpass filtered to a frequency band of interest, and arranged in a matrix indexed by time and trace number. A singular value decomposition (SVD) is used to separate the traces into signal and noise subspaces, with the signal subspace basis vectors retained and encoded.

In another embodiment, the bandpassed traces or signal subspace basis vectors are downsampled to a lower sampling rate according to the bandwidth of the bandpass filter.

In another embodiment, a plurality of subspace basis vector sets are separately formed and encoded, and successively stored or transmitted, with each requiring additional memory or bandwidth, and each providing additional detail with which to reconstruct the seismic data.

In a related embodiment, trace band energy envelopes are formed, and non-negative matrix factorization (NNMF), probabilistic latent component analysis (PLCA), or other machine learning method, is used in forming the signal and noise subspaces, and separate signal components. In another related embodiment, convolutional PLCA is used to produce signal components associated with events having similar moveouts.

In another embodiment, a seismic event is detected, and the traces are time-aligned according to an estimate of the event waveform moveout. Signal and noise subspaces are computed according to the time-aligned traces, and a signal component is formed by projecting orthogonal to the noise subspace. In another embodiment, the estimated waveforms are correlated with the trace data to re-estimate wavefront arrival times, which in turn, are used in an iterative process to update the waveform estimates.

In another embodiment, a collection of bands is formed, and an SVD is formed on the tensor of recorded amplitude as a function of time, trace, and band. In a related embodiment, trace spectrograms are arranged into a tensor having time, frequency, and trace number axes, and a tensor factorization, such as PLCA, is used to find the signal subspace and noise subspace.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, an approach to data compression according to embodiments flows from the observation that the desired arriving wavefronts have structure which can be expressed with relatively few parameters, while the additive seismic background and sensor noise are difficult to compress, requiring a significant amount of data to describe. Here, we process the recorded seismic traces to produce an encoded signal component that has been separated from an additive noise component. In this way, the signal component retains its clear structure across the traces, and is compactly described without loss of important information.

Figure 1:
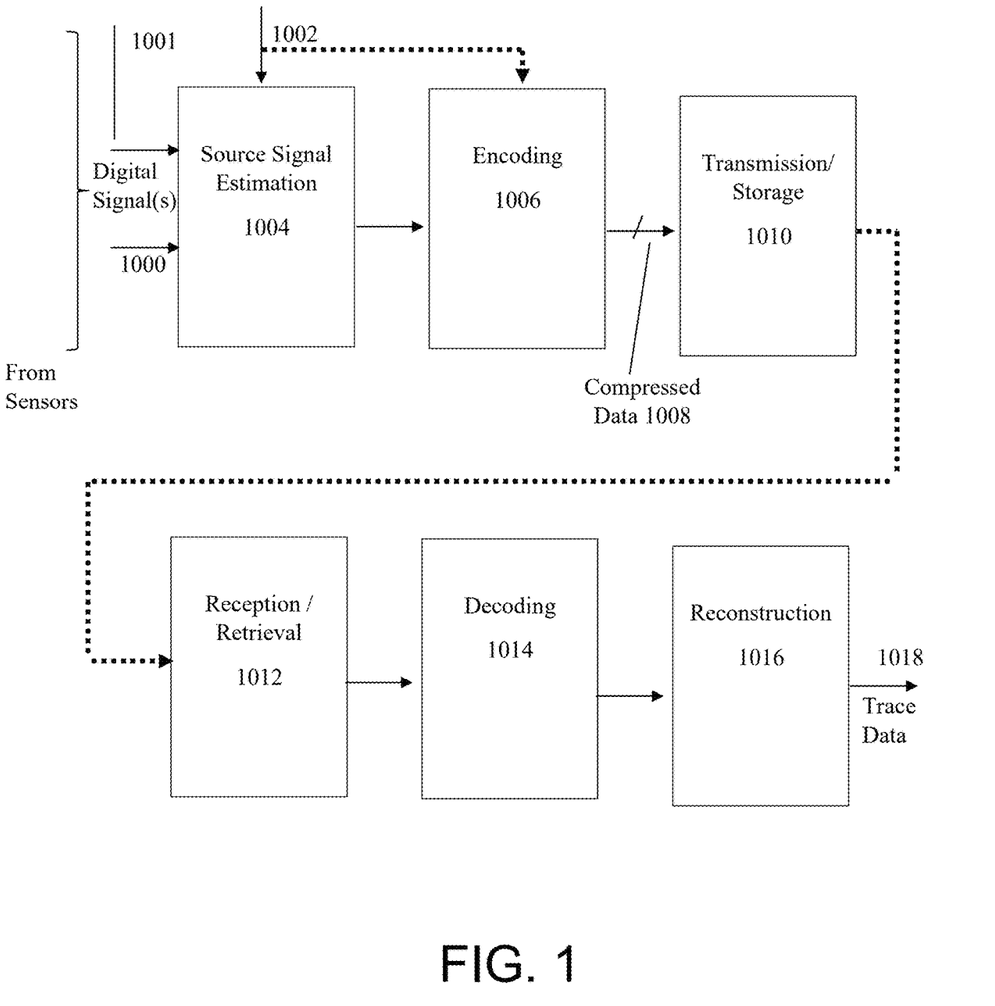
FIG. 1 illustrates aspects of a Seismic Data Compression and Transmission Method according to embodiments. Data collected from an array of seismic sensors containing seismic sources of interest, as well as seismic background and other "noise" sources, is processed to both estimate the source signals as they appear across the array and to reduce the amount of memory and bandwidth required to store or transmit the collected data.

One example system according to embodiments is shown in FIG. 1, in which the seismic traces and other information are processed and encoded to achieve a data compression. The compressed data is then stored or transmitted for future retrieval or reception, at which point it may be decoded into traces, or event waveforms or other seismic source waveforms. In the example of FIG. 1, seismic data 1000, such as traces from a sensor array, and information 1001 about the sensor array, propagation environment, and the like, are processed in source signal estimator 1004 to estimate source signal components of interest and their structure as they appear across the array 1005, and according to given memory or bandwidth targets 1002. Those skilled in the art of seismic signal collection and processing will understand various processors, communications means, hardware and/or software to implement these and other functions. According to the present embodiments, the estimated components and structure are then encoded 1006 to produce compressed seismic data 1008, which is transmitted and/or stored 1010. The transmitted or stored compressed seismic data may then be received or retrieved 1012, decoded 1014 and reconstructed 1016 into the expanded trace data 1018, which is an estimate of the desired seismic signals arriving at the array. The following descriptions will enable those skilled in the art to adapt or supplement existing technologies to perform these compression, encoding, decoding and reconstruction functions according to embodiments.

It should be pointed out that while the following discussion is relative to transient seismic events, the teachings described herein apply just as well to other sources of seismic energy arriving at the sensor array in a way that is spatially structured, that is structured in some way across sensors.

Consider first a seismic record from an array of M sensors containing a single seismic event. Each sensor receives signals $g_m(t)$, measured along one or more sensor components as a function of time t. The measured signal at sensor m is assumed to be an event waveform $s_m(t-\tau_m)$ arriving at time $\tau_m$ with polarization $\beta_m$ in additive noise $n_m(t)$ consisting of seismic background and sensor noise, $$g_m(t)=s_m(t-\tau_m)\beta_m^\tau + m_m(t), \tag{1}$$

where $\cdot^\tau$ denotes matrix transpose. The goal is to estimate the arriving event waveforms $s_m(t)$ at each sensor m from the measured seismic traces $g_m(t)$, m=1, ..., M. It should be noted that for P-wave arrivals, $s_m(t)$ and $\beta_m$ will have one column, while for S-wave arrivals, $s_m(t)$ and $\beta_m$ can have two columns. For clarity in the following, $s_m(t)$ and $\beta_m$ are treated as having one column, representing P-waves or S-waves polarized along a single direction. It will be apparent to those skilled in the art how to extend the principles described herein to the case of $s_m(t)$ and $\beta_m$ having multiple (e.g. two or more) columns.

Figure 2:
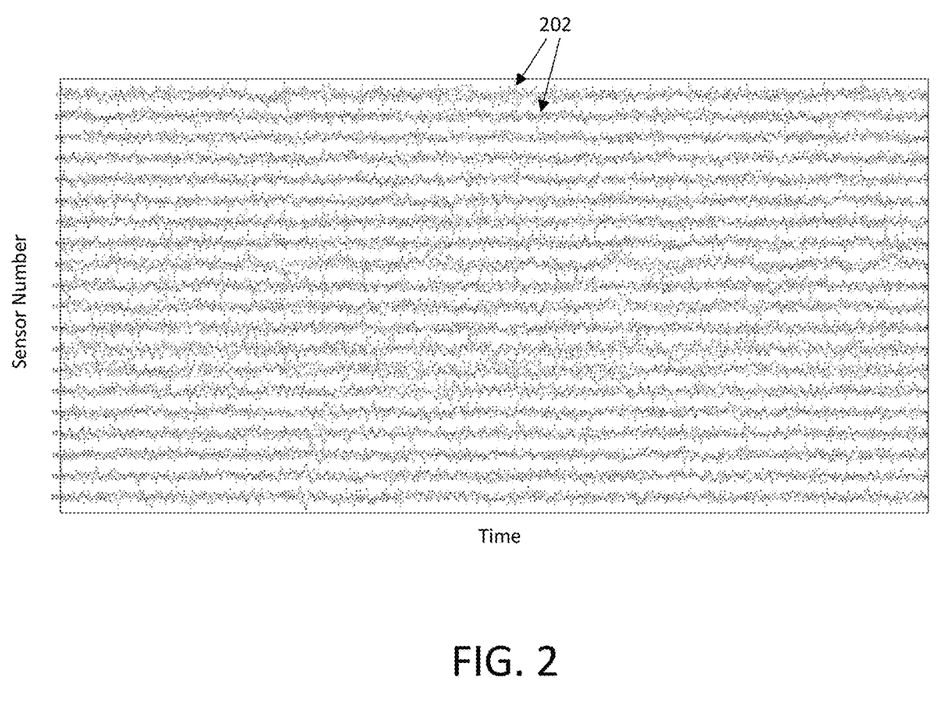
FIG. 2 illustrates Example Measured Traces. Traces from a set of 20 three-component sensors show a P-wave arrival in a seismic background.
Figure 3:
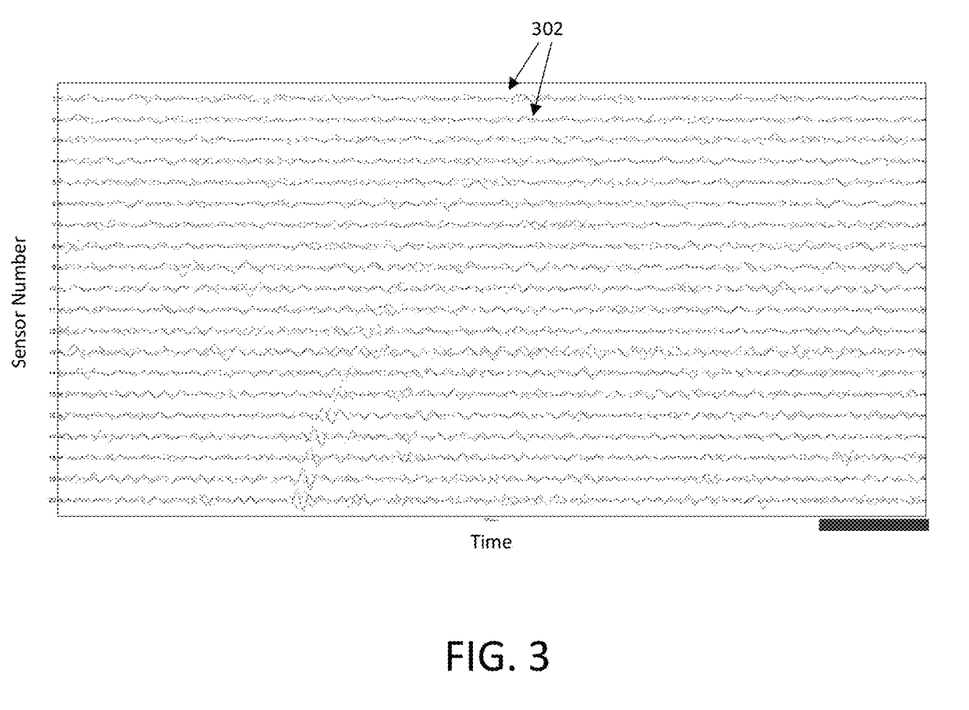
FIG. 3 illustrates an example of Band-Pass Filtered Traces. The traces of FIG. 2 were bandpass filtered to enhance the event arrival relative to the seismic background.

A set of measured traces 202 is shown in FIG. 2. In this example, there are M=20 sensors, and a P-wave arrival is present in a background of seismic energy. It is typical to band-pass filter the trace data according to the arrival spectrum and seismic background, as seen in FIG. 3. Here, the applied band-pass filtering has been adjusted for the arriving wavefront so that the background is suppressed at frequencies where the SNR is less than 0 dB. Note that the arrival is more prominent in traces 302 after band-pass filtering. While the band-pass filtering suppresses some of the seismic background and the arriving wavefronts are more clearly visible, important waveform features remain obscured.

Figure 4:
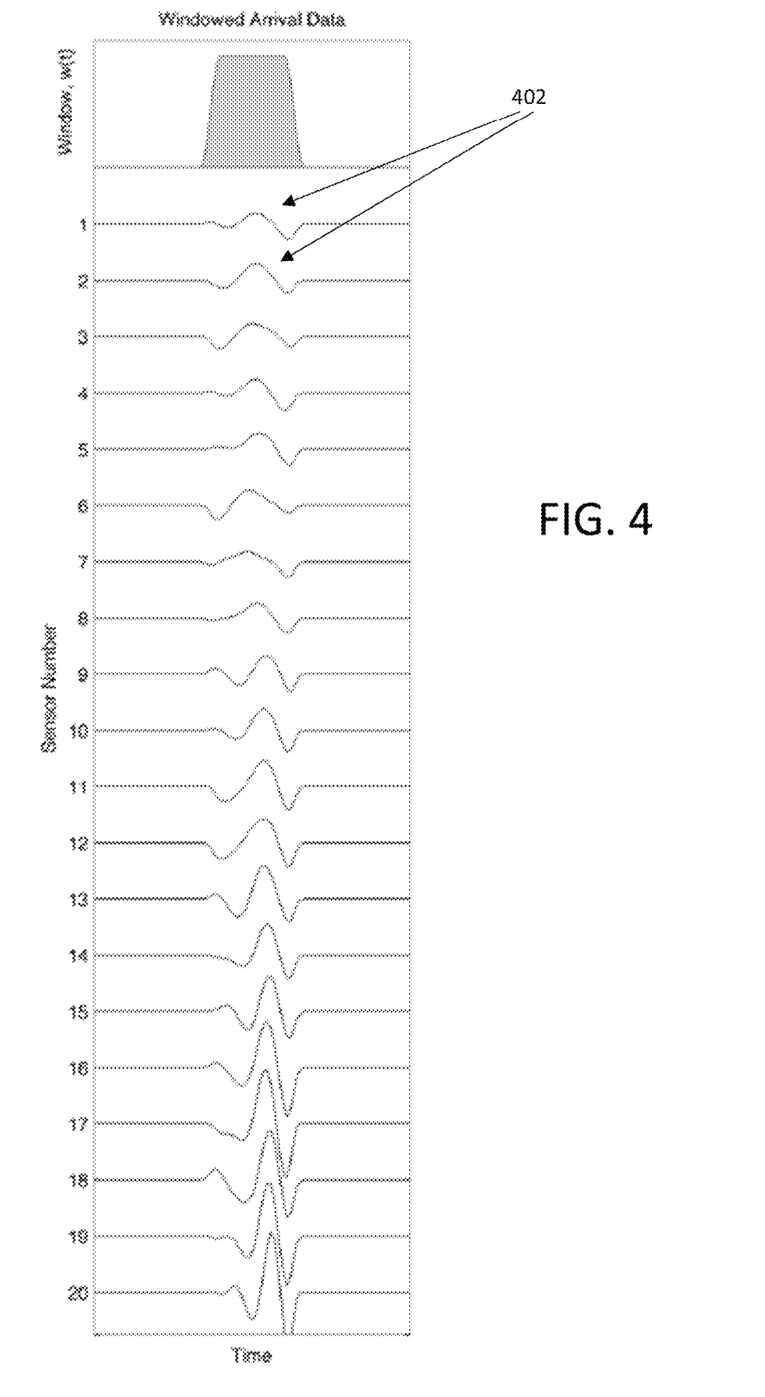
FIG. 4 illustrates an example of Aligned, Oriented, and Windowed Traces. The traces of FIG. 3 were time aligned according to the arrival moveout, oriented according to the polarization, and windowed to capture the duration of the arrival.

In an embodiment, trace data (band-pass filtered, e.g.) is time aligned according to an estimate of the arrival moveout so as to have the event wavefront arrive at all sensors simultaneously. Additionally, if the sensors contain multiple components, these components are combined in such a way as to point each sensor in the direction at which it achieves its maximum SNR, thereby generating a single trace 402 for each sensor. (Other methods, such as pointing the sensor according to the source direction, may be used to combine the sensor traces into a single component.) This set of aligned, oriented traces is then time windowed to select the duration over which the wavefront appears. The traces of FIG. 3 accordingly aligned, oriented, and windowed are shown in FIG. 4.

It should be noted that SNR may be estimated by examining the signal level before and during the event arrival, and that the direction of maximum SNR may be found by a search over arrival directions. It should be pointed out that the direction at which the maximum SNR is achieved is not necessarily determined by only the source direction. This is because while the source energy is maximized when the sensor is oriented according to the source direction, the maximum is rather broad. By contrast energy from a noise source is minimized when the sensor is oriented perpendicular to the noise source polarization, but the minimum is relatively narrow. As a result, the SNR maximizing orientation will often be more aligned perpendicular to a dominant noise source than along the source direction.

Denote by $h_m(t)$ the time-aligned, oriented, and windowed sensor signals, evaluated at sample time t, $$h_m(t)=w(t)\cdot g_m(t+\tau_m)\beta_m, \; m=1,2,\ldots,M, \tag{2}$$

where w(t) represents the time window, which is zero outside the T-sample long duration of the aligned arrivals. Denote by $h_m$ the column of T samples of $h_m(t)$, $$h_m=[h_m(1) h_m(2) \ldots h_m(T)]^T, \tag{3}$$

and by H the T×M matrix of time-aligned, oriented, and windowed sensor signals, $$H=[h_1 \; h_2 \ldots h_M]. \tag{4}$$

The columns of the arrival waveform matrix H consist of sampled event waveforms $s_m(t)$ in a background of noise $n_m(t+\tau_m)$.

The event waveforms are expected to be similar sensor to sensor, and should be accurately represented by the weighted sum of a relatively small number of basis shapes. The noise, on the other hand, is expected to vary in an uncorrelated manner from sensor to sensor. In this way, one can decompose the arrival waveform matrix into signal and noise subspaces (say, via singular value decomposition), and estimate the event waveforms at each sensor as that portion of the arrival waveform matrix H lying in the subspace associated with its few larger singular values.

Denoting by S the matrix of arrival waveforms, $$S=[s_1 \; s_2 \ldots s_M], \tag{5}$$

where $s_m$ is the vector of sensor m event waveform samples $s_m(t)$, t=1, 2, ..., T, one can model the arrival waveforms as $$\hat{S}=U_L W_L, \tag{6}$$

where $U_L$ is an L-column matrix of T-long orthonormal waveform basis shapes, and $W_L$ is an M-column matrix of L-element weights. The basis waveform shapes and weights can be found via singular value decomposition of H, for instance using the MATLAB function call svd(H,'econ'), to write $$UDV^1=H, \tag{7}$$

where U is the T×M matrix of orthonormal basis shapes, D is an M×M diagonal matrix of singular values dl, l=1, 2, ..., M, arranged largest to smallest, and V is an M×M orthonormal matrix of normalized weights. To estimate the sensor waveforms during the arrival, the order L is selected, and (6) is used to construct the estimated waveforms, with $U_L$ being the first L columns of U, and $W_L$ being the first L rows of the product $DV^1$. (Note that the singular values D could be apportioned in any manner between U and $V^1$ in computing the waveform estimates.) In some sense, $\hat{S}$ reconstructs the event arrival waveforms without using the noise-like components.

Figure 5:
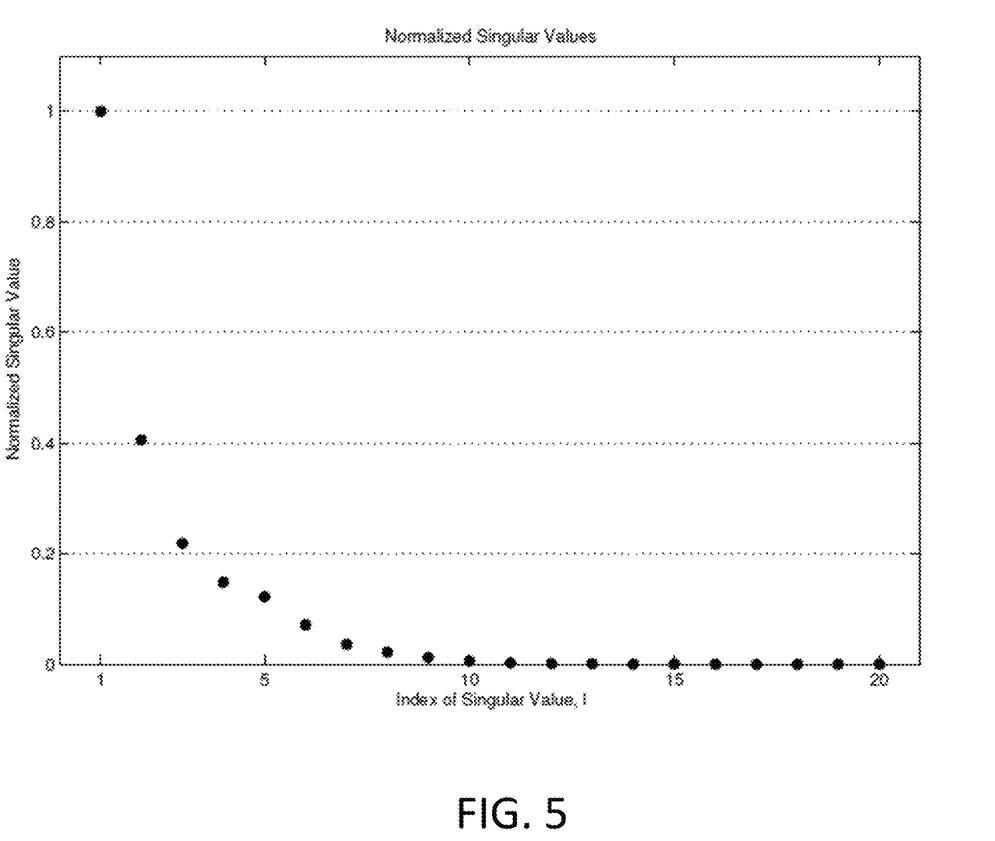
FIG. 5 illustrates aspects of Singular Values according to embodiments. Singular values are plotted as a function of model order for the arrival waveform matrix H of FIG. 4. Note the few larger singular values associated with the arrival waveform, and the many singular values associated with the seismic background.
Figure 6:
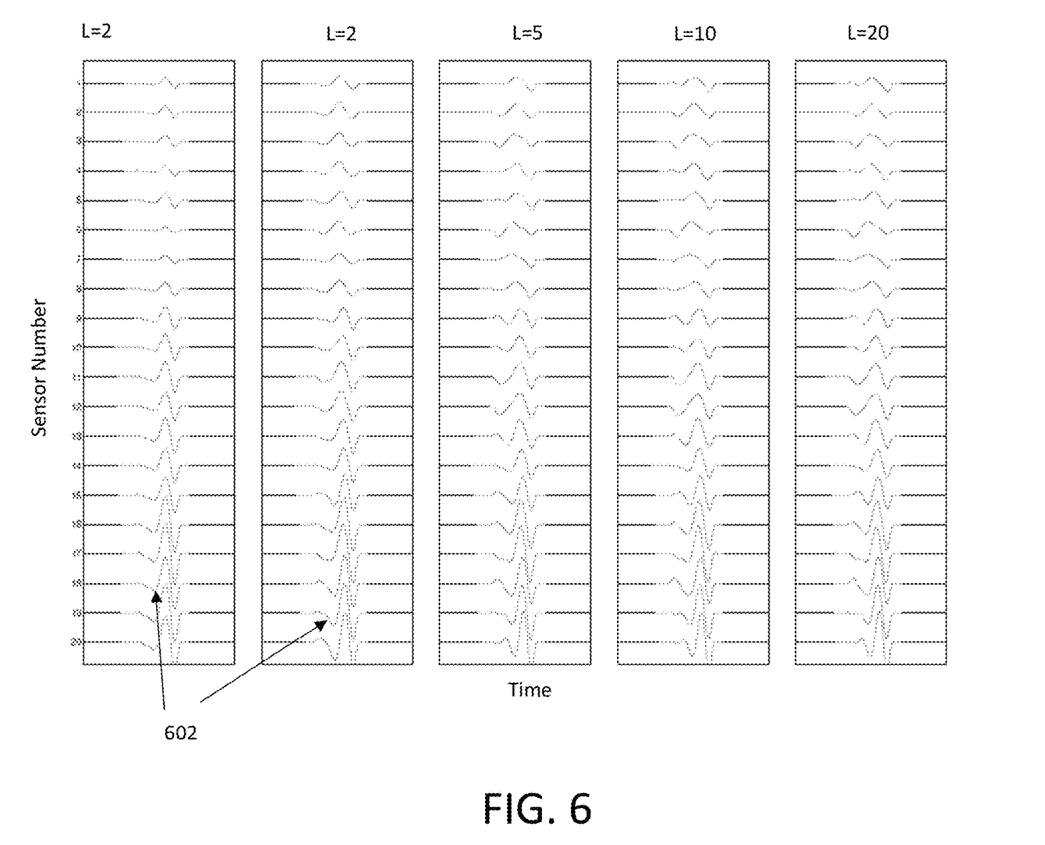
FIG. 6 illustrates example Arrival Waveform Estimates, Various Model Orders. Estimates of the sensor event arrival waveforms are shown for orders L=1, 2, 5, 10, 20.
Figure 7:
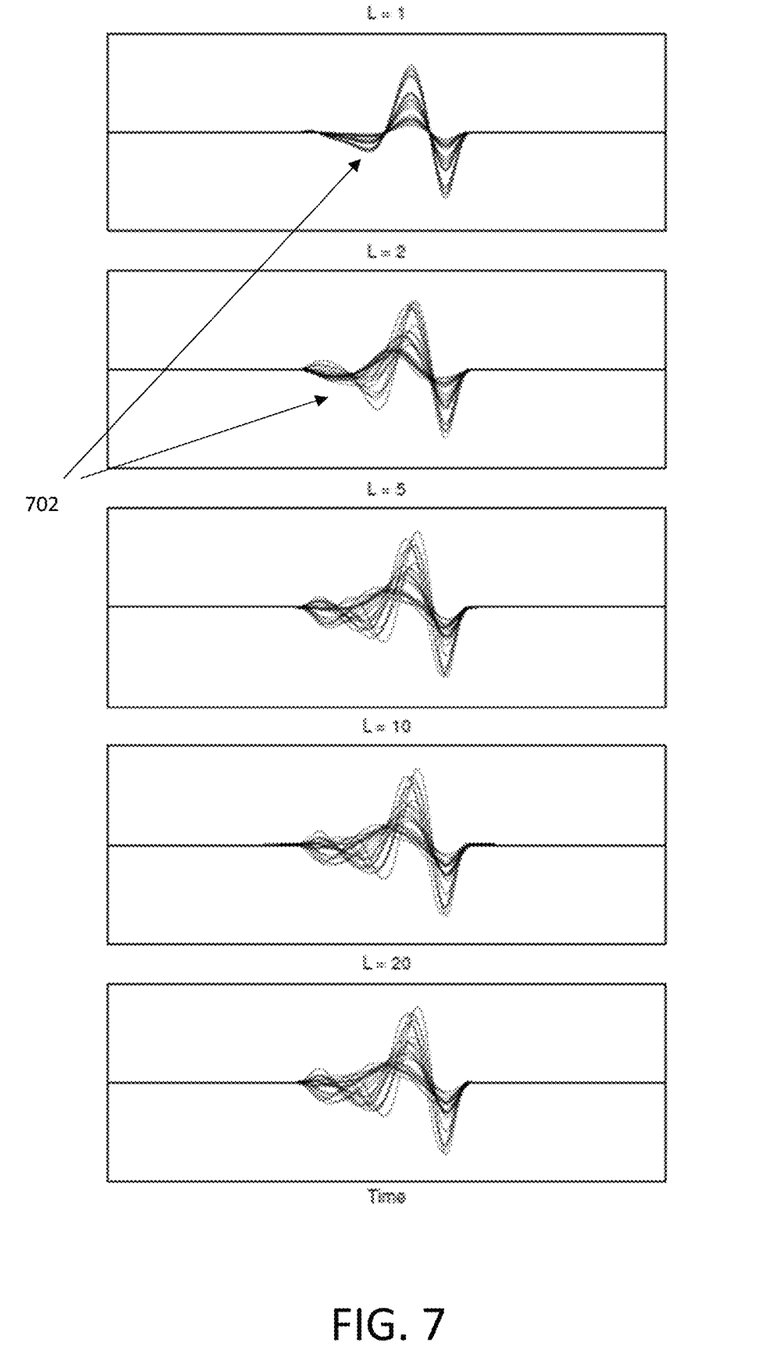
FIG. 7 illustrates example Arrival Waveform Estimates, Various Model Orders. Estimates of the sensor event arrival waveforms are shown overlaid for orders L=1, 2, 5, 10, 20.

As an example, FIG. 5 shows the singular values of the sensor signal matrix shown in FIG. 4. There are a handful of larger singular values, with the rest being similarly small. The few larger singular values are associated with the arriving event waveforms; the others are associated with noise. FIG. 6 shows the estimated sensor arrival waveforms 602 for model orders L=1,2,5,10,20 as a waterfall plot, and FIG. 7 shows the same estimated waveforms 702 from all sensors overlaid for each model order. Note that as the order decreases from the total number of sensors, L=M (which exactly reproduces the arrival waveform matrix) to L=1, the noise energy is monotonically reduced, with the order 1 estimate $\hat{S}_1$ having roughly 1/M of the noise energy in the original traces H. Also note that with a model order of L=1, the estimated waveform shape (but not its amplitude) is unchanging from sensor to sensor. As the model order is increased, differences in waveform shape sensor-to-sensor become better modeled. Accordingly, to pick the model order, it is preferred to select the smallest order L that appears to capture the arrival waveform changes across the array. This can be done by comparing the estimated waveforms $\hat{S}$ and original sensor signals H. It can also be achieved by analyzing the singular values, for instance finding the order L after which the singular value decreases significantly, i.e. the order L such that $d_L/d_{L+L}$ is relatively large, or finding the order L for which a given percentage of the trace energy is contained in the first L singular values While estimates of the arriving waveforms are useful in determining arrival parameters, it may also useful to generate "cleaned" versions of the original trace data that has been similarly processed to preserve event arrival waveforms while reducing background noise. Note that the singular value decomposition above produces a time basis U and a sensor basis V. To "clean" an entire seismic record containing the wavefront arrival, the entire record may be projected onto the sensor basis. This may be done as follows: First generate time-aligned, oriented traces (essentially $h_m(t)$, but not windowed), $$k_m(t)=g_m(t+\tau_m)\beta_m,\ m=1,2,\ldots,M, \quad (8)$$

and form the matrix K using $k_m(t)$ as its t, mth row-column element. Then project the traces onto the first L columns of V, denoted $V_L$, $$\hat{R}=KV_LV_L^1. \quad (9)$$

Figure 8:
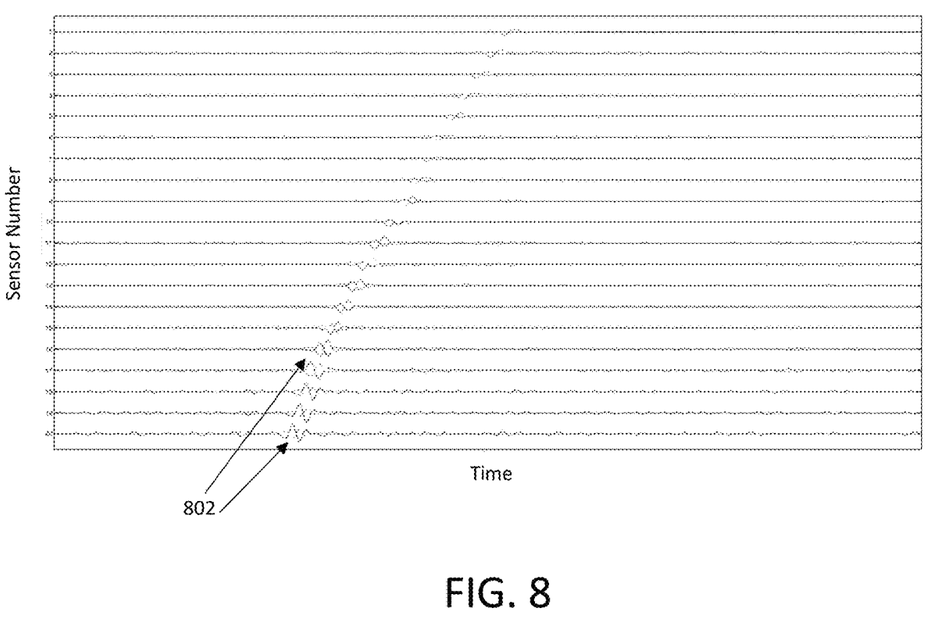
FIG. 8 illustrates example Trace Waveform Estimates according to embodiments. Estimates of the sensor traces are shown for order L=2.

In this way, the entire duration of the traces K is processed, not just the time window used to find V. Note that the estimated traces $\hat{R}$ will match the estimated arrival waveforms $\hat{S}$ in the arrival time window. Finally, the estimated waveforms $\hat{R}$ are time shifted back to their original moveout, and each sensor signal is rotated according to its polarization to generate multi-component "cleaned" traces. As an example, processed versions of the raw trace data appearing in FIG. 2 are shown in FIG. 8, where the processed traces $\hat{R}$ 802 have been generated according to (9) using V as constructed from the event arrival data H shown in FIG. 4 with order L=2($V_2$). Note the P-wave arrival is clearly visible, and that the seismic background is suppressed.

Figure 9:
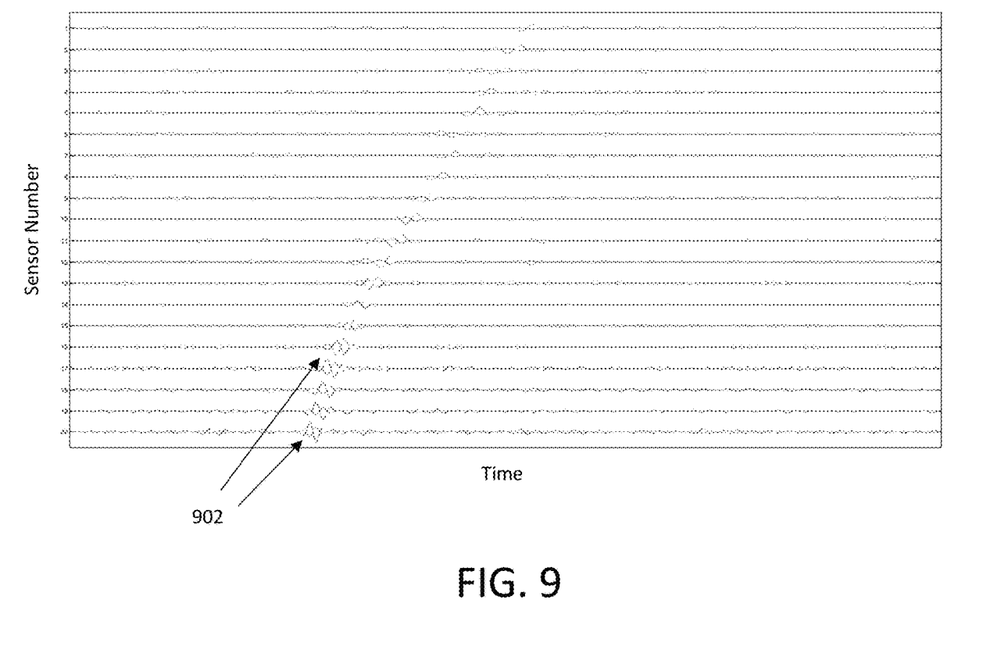
FIG. 9 illustrates example Trace Waveform Estimates according to embodiments. Estimates of the sensor traces are shown for order L=5.

Trace estimates 902 made using L=5 are shown in FIG. 9. Compared with the L=2 estimate shown in FIG. 8, arrival waveform changes across the array are more closely tracked using the L=5 estimate; however, the seismic background is less suppressed.

One question concerns the nature of the waveform estimation errors in $\hat{S}$ or $\hat{R}$. It is expected that the estimation errors to be additive and noise-like as the estimates are constructed additively, and their errors are expected to result from including unwanted portions of additive noise in the signal basis or including noise subspace components by choosing an order L which is too large. Therefore, this process is not expected introduce systematic changes in the phase or magnitude of the arriving wavefronts. This seems to be the case, as evidenced by the similarity between the "cleaned" and bandpass filtered arrivals as the wavefront traverses the array in FIG. 3, FIG. 4, FIG. 8 and FIG. 9.

The estimated arrival waveforms can be used to generate improved event arrival-time and polarization estimates for each sensor. Event arrival polarizations may be estimated using the projection of the estimated arrival waveforms $\hat{S}$ onto the corresponding sensor's multi-component trace data:

$$\beta_m=[g_m(1+\tau_m)^1\ \ldots\ g_m(T+\tau_m)^1]\hat{S}_m, \quad (10)$$

$$\beta_m=\rho_m/\|\rho_m\|, \quad (11)$$

where $\hat{s}_m$ is the estimated arrival waveform at the mth sensor. Similarly, arrival times can be estimated by cross correlating the estimated arrival waveforms with the corresponding sensor's trace data, preferably oriented according to the arrival polarization or the direction of maximum SNR, and finding the correlation lag at which the cross correlation is maximized. Note that these cross-correlations could also be performed using multi-component input trace data and the multi-component signal estimates made using the method described below directly, without reducing the data to a 1-dimensional signal per sensor.

The case of planar motion (two-dimensional $s_m(t)$ and $\beta_m$) may be accommodated by first solving for the first column of $\beta_{m1}$, then subtracting that direction $\hat{s}\beta_1^T$ from $g_m$, and finally repeating the 1-D process with that first dimension of motion removed.

Improved event arrival waveform estimates may be found iteratively by first using the process above to estimate the arriving waveforms, and then using those waveforms to form new arrival-time and polarization estimates. The new arrival times and polarizations are then used to generate a new set of arrival waveform estimates, and so on until the process converges, or for a given number of iterations.

Another embodiment forms the arrival waveform matrix without first combining multi-component sensor signals to produce a reduced-dimension signal for each sensor such as a single, directionally oriented trace for each sensor. Denote by $\tilde{h}_m(t)$ the time-aligned and windowed component signals of sensor m, evaluated at sample time t, $$\tilde{h}_m(t)=w(t)\cdot g_m(t+\tau_m),\ m=1,2,\ldots,M, \quad (12)$$

where w(t) represents the time window, which is zero outside the T-sample long duration of the aligned arrivals. For a collection of sensors each having N components, denote by $\tilde{H}$ the T×NM matrix of time-aligned and windowed multi-component sensor signals, $$\tilde{H}=\begin{bmatrix} \tilde{h}_1(1) & \tilde{h}_2(1) & \ldots & \tilde{h}_M(1) \\ \vdots & \vdots & \vdots & \vdots \\ \tilde{h}_1(T) & \tilde{h}_2(T) & \ldots & \tilde{h}_M(T) \end{bmatrix}, \quad (13)$$

where the multi-component arrival waveform matrix $\tilde{H}$ is N-times as wide as the oriented arrival waveform matrix H.

To estimate the event arrival waveforms, the multi-axis waveform matrix is split into signal and subspace matrices. As above, a singular value decomposition can be used, $$\tilde{U}\tilde{D}\tilde{V}^\tau = \tilde{H}, \quad (14)$$

with $\tilde{U}$, $\tilde{D}$ and $\tilde{V}$ and being the orthonormal basis shapes, diagonal matrix of singular values (arranged largest to smallest), and orthonormal matrix of normalized weights. As above, the multi-component arriving wavefront signal may be estimated using a given number of singular values L, $$\tilde{S} = \tilde{U}_L \tilde{W}_L, \quad (15)$$

where $\tilde{U}_L$ is the matrix made from the first L columns of $\tilde{U}$, and $\tilde{W}_L$ is the first L rows of $\tilde{D}\tilde{V}^\tau$. Similarly, any duration of trace data may be projected onto the columns of $\tilde{V}_l$ (as above) to estimate the arrival signal from an entire record.

Note that the N columns of $\tilde{W}_L$ associated with a given sensor are likely to have a rank which is the lesser of N and L. Accordingly, when L>1, the different waveform shapes specified by $\tilde{U}_l$ will be added in different proportions to estimate the arrival waveform along each component of a sensor. However, a P-wave arrival has motion along only the arrival direction; an S-wave arrival can involve motion only in the plane perpendicular to the arrival direction. As a result, it is preferred to replace the columns of $\tilde{W}_L$ associated with each sensor by either a rank one or rank two approximation, depending on the arrival, for instance found by singular value decomposition of each sensor's L×N portion of $\tilde{W}$. Note that the row space of this rank one or rank two approximation can be used as an estimate of the arrival polarization. Finally, note that this procedure may be applied in the case that different sensors within the array have varying number of components.

Data compression may be achieved in a number of ways. In one method, arrivals of seismic energy contained in the trace data are detected, their parameters such as polarizations and moveouts estimated, and their waveforms modeled using a small, but sufficient number of basis shapes as described above. The resulting basis shapes and other parameters, which represent a potentially significant reduction in data needed to approximate the original sensor data or desired components therein, are then compressed using a lossless or nearly lossless data compression scheme.

The trace data may be compressed by retaining only L signal subspace components of the original trace data, that is by storing $V_L$ and $KV_L$ along with the associated arrival times and polarizations. Doing so requires only about L/(qN) the amount of storage needed for the original data, q being the number of axes measured for each trace, e.g. q=1 for a DAS. For the example here, one can achieve a data reduction by a factor of 10 for the 20 traces of data by retaining 2 components. Furthermore, standard lossless or nearly lossless data compression methods may be used to achieve further data reduction by encoding the weights and basis waveforms $V_L$ and $KV_L$ using a lossless or nearly lossless data compression scheme.

Note that in certain scenarios, it may be desired to transmit or store a "low-resolution" version of the trace data using little bandwidth or space, and then transmit additional data to achieve a more complete rendering of the seismic data. This can be achieved by first transmitting an initial number of basis vectors and weights (the most energetic dimensions of the signal subspace, e.g.), and then transmitting more of the basis vectors and weights.

Alternatively, data compression may be achieved using a convolutional model to separate multiple simultaneously arriving waveforms from a noise background. In these cases, there will be a number of estimated sources, each source formed according to a set of basis waveforms in time that are weighted according to the sensor number, and delayed according to an arrival time and moveout.

Data compression is also possible using SVD, NNMF, PLCA or other matrix or tensor factorization methods to extract a low-dimensional signal space from a set of traces directly without explicitly estimating features such as moveouts of separate seismic sources.

Another method of achieving data compression takes the matrix of traces over time, and forms, for each trace, a time-frequency analysis such as a spectrogram or wavelet transform as a pre-processing step to the above SVD, PLCA, or related method. The time-frequency analysis reveals frequencies at which energy appears across neighboring traces, and can lead to compact representations of the underlying trace data.

Finally, only certain frequency bands may be of interest, or different frequency bands may be useful for different purposes. In compressing the trace data for transmission or storage, the different frequency bands may be separately processed using the techniques described herein via band-splitting or similar filters, such as those used in perceptual audio coding or subband image coding. Note that each frequency band processed may be downsampled according to its bandwidth, further reducing the data storage space and transmission bandwidth requirements.

Figure 10:
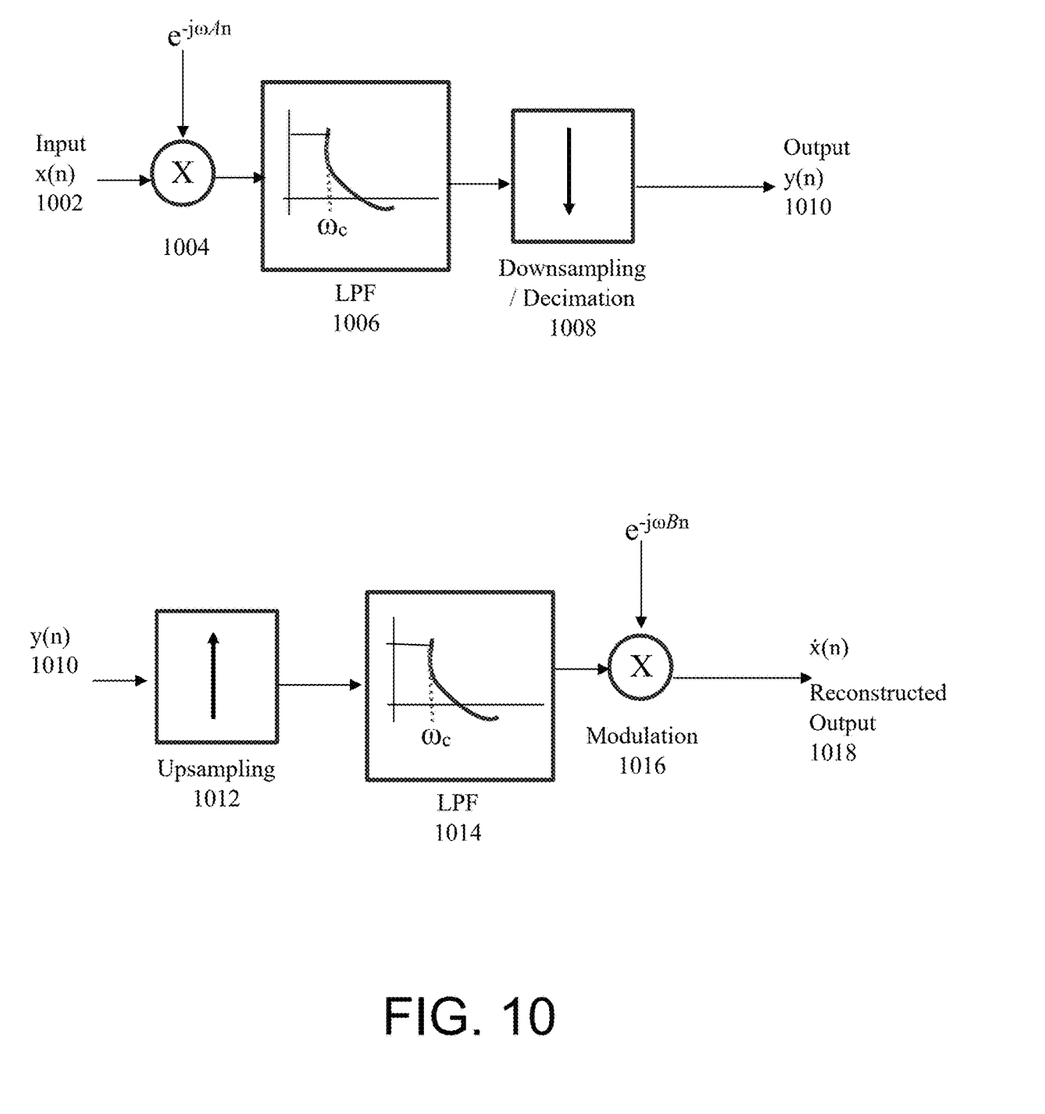
FIG. 10 illustrates example aspects of Subband Coding according to embodiments. An input, for instance a column of the time basis matrix or a sensor trace, is heterodyned to base band, low-pass filtered, and downsampled in preparation for encoding and storage and/or transmission. After retrieval, it is upsampled, filtered, and modulated to reconstruct the original waveform band.

Additionally, different subbands may have different associated rates of compression, e.g., using different subspace dimensions L. An example of such a system is shown in FIG. 10. Here, a band of interest (formed using heterodyning 1004 of the input signal x(n) 1002 with frequency $\omega_A$ and lowpass filtering 1006 with cutoff frequency $\omega_c$) is formed and downsampled 1008 according to its bandwidth. The output signal 1010 may then be compressed and stored or transmitted, and reconstructed to output 1018 after being retrieved or received using upsampling 1012 and lowpass filtering 1014 followed by modulation by frequency $\omega_B$ ($\omega_A = \omega_B = \omega_M$ preferably).

Figure 11:
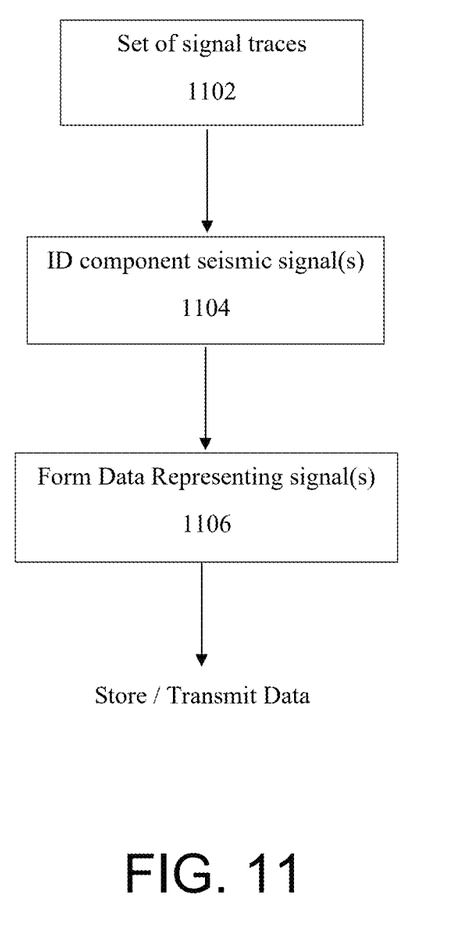
FIG. 11 is a flowchart illustrating an example methodology according to embodiments.

An example flowchart of the above-described methodology is shown in FIG. 11. As shown, the set of signal traces is received in 1102 (e.g. from a set of sensors in a sensor array). The component seismic signals are identified in 1104 (e.g. using filtering, time aligning, windowing, etc.). Data representing the signals is formed in 1106 (e.g. using matrix processing as described above and/or data compression techniques described above). The data from 1106 can then be stored and/or transmitted. This stored/transmitted data can then be used to reconstruct signal traces as described above.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for processing a set of M seismic traces from an array of sensors so as to reduce its storage or transmission requirements, while reducing the presence of seismic background or noise in a reconstructed set of seismic signals, comprising:
    identifying one or more component seismic signal sources appearing additively in the set of M seismic traces, each component seismic signal source defined by L component source time waveforms and related amplitudes, wherein L<M; and
    storing or transmitting data representing the L component source time waveforms and related sensor amplitudes for each component seismic signal source.

2. The method of claim 1, wherein the related source amplitudes comprise corresponding trace amplitudes.

3. The method of claim 1, further comprising:
    replacing the set of M seismic traces, each T samples long, with a sum of a number of sources, in which each source, defined over the set of M traces and T sample times, is formed by taking a single waveform T samples long, and scaling it according to each of a set of M amplitudes to produce the set of M traces for that source.

4. A method for processing a set of M seismic traces from an array of sensors so as to reduce its storage or transmission requirements comprising:
    identifying a component seismic signal of interest from the M seismic traces, the component seismic signal of interest comprising one or more time waveforms, and for each of the time waveforms, M weights corresponding to the M seismic traces;
    generating data representing the component signal from one of the one or more time waveforms and corresponding M weights; and
    storing or transmitting the generated data representing the component seismic signal of interest processed from the set of M seismic traces.

5. The method of claim 4, wherein the component seismic signal component of interest also comprises one or more sensor time offsets.

6. The method of claim 4, further comprising:
forming basis vectors that describe a subspace of a matrix or tensor of data derived from the set of seismic traces.

7. The method of claim 4, further comprising:
replacing the set of M seismic traces, each T samples long, with a sum of a number of sources, in which each source, defined over the set of M traces and T sample times, is formed by taking a single waveform T samples long, and scaling it according to each of a set of M amplitudes to produce the set of M traces for that source.

8. The method of claim 4, wherein the component seismic signal of interest corresponds to a microseismic event at time t detected by the array of sensors, and wherein identifying the component seismic signal of interest includes time aligning the M seismic traces according to the time t.

9. The method of claim 4, wherein each of the M seismic traces includes two or more sensor components, and wherein identifying the component signal of interest includes combining the two or more sensor components into a single component for each of the M seismic traces.

10. The method of claim 9, wherein the two or more sensor components are associated with two or more types of microseismic event waves, including P-waves and S-waves.

11. A method for reducing the storage or transmission requirements of a set of M seismic traces from an array of sensors comprising:
identifying a matrix of data representing the M seismic traces;
forming basis vectors that describe a subspace of the matrix of data representing the set of M seismic traces, wherein an amount of data corresponding to the formed basis vectors is less that the matrix of data; and
storing or transmitting data for the set of M seismic traces using the formed basis vectors.

12. The method of claim 11, wherein the basis vectors comprise one of time basis vectors or trace basis vectors.

13. The method of claim 11, further comprising:
replacing the set of M seismic traces, each T samples long, with a sum of a number of sources, in which each source, defined over the set of M traces and T sample times, is formed by taking a single waveform T samples long, and scaling it according to each of a set of M amplitudes to produce the set of M traces for that source.

* * * * *